United States Patent [19]

Kubotani

[11] Patent Number: 5,136,793
[45] Date of Patent: Aug. 11, 1992

[54] HEAT RECOVERY SYSTEM FOR A PULSE COMBUSTION DRYING APPARATUS

[75] Inventor: Atsuyoshi Kubotani, Amagasaki, Japan

[73] Assignee: Osaka Fuji Kogyo Kabushiki Kaisha, Amagasaki, Japan

[21] Appl. No.: 627,831

[22] Filed: Dec. 17, 1990

[30] Foreign Application Priority Data

Dec. 16, 1989 [JP] Japan .................. 1-326862

[51] Int. Cl.$^5$ ............................................. F26B 19/00
[52] U.S. Cl. .................................. 34/86; 432/58; 432/25; 34/191; 431/1; 431/215; 110/204
[58] Field of Search ................. 34/86, 85, 191; 110/204, 215, 216, 224, 238; 431/1, 11, 207, 243, 215; 122/24; 432/58, 25

[56] References Cited

U.S. PATENT DOCUMENTS

| | | | |
|---|---|---|---|
| 3,446,493 | 5/1969 | Imai et al. | 110/204 |
| 3,648,630 | 3/1972 | Hobbs et al. | 110/204 |
| 4,917,027 | 4/1990 | Albertson et al. | 110/245 |
| 4,926,765 | 5/1990 | Dreizler et al. | 110/204 |
| 4,941,820 | 7/1990 | Lockwood, Jr. | 432/58 |
| 4,959,009 | 9/1990 | Hemsath | 122/24 |
| 4,974,335 | 12/1990 | Bege et al. | 34/86 |
| 4,992,043 | 2/1991 | Lockwood, Jr. | 432/58 |

Primary Examiner—Henry A. Bennet
Assistant Examiner—Denise L. F. Gromada
Attorney, Agent, or Firm—Cushman, Darby & Cushman

[57] ABSTRACT

A heat recovery system is disclosed for a pulse combustion drying system in which the exhaust gas of combustion from a pulse combustor passes successively through a dryer, a product collector and a scrubber. The heat of the exhaust gas is recovered in the scrubber by spraying with water or other liquid and transferring by heat exchange the heat absorbed by the water to compressed air, and passing the heated compressed air successively through a membrane heat exchange tube on the wall of the product collector and a membrane heat exchange tube on the wall of the dryer. The air is discharged finally in an air-injection nozzle of the pulse combustor.

2 Claims, 3 Drawing Sheets

5,136,793

HEAT RECOVERY SYSTEM FOR A PULSE COMBUSTION DRYING APPARATUS

FIELD OF THE INVENTION

The present invention relates to a heat recovery system for a pulse combustion drying apparatus to obtain grainy dried substances from those in a paste or slurry state of solid compounded with liquid.

DESCRIPTION OF THE PRIOR ART

A pulse combustion drying apparatus provided with a heat recovery system is disclosed in Japanese Patent Laid-Open Publication No. 60-238677. The pulse combustion drying apparatus comprises a pulse combustor for generating strong sound waves and high temperature combustion gas, a separation chamber for drying substances including water, and a cyclone and a scrubber for collecting dried substances. In this heat recovery system, the cyclone and the separation chamber are enclosed with a double wall so that air is drafted to the pulse combustor through the gap between the double wall. The air is provided with heat by the double wall of the cyclone and the separation chamber whose temperature is very high because of an explosion in the pulse combustor and becomes dried air with high temperature, and the air in this state is very combustible when it is mixed with fuel. Consequently, the combustion efficiency is increasing. However, in this system, there are no means of collecting and recycling the heat of the combustion gas with comparatively high temperature which is coming out of the pulse combustion drying apparatus and the heat of the water which is ejected from the scrubber, thereby causing a waste of heat.

A pulse combustion drying apparatus produced by Sonodyne Industries in Portland, Oreg. has a pulse combustor including a U-shaped tube. Thereby, the high temperature and high pressure combustion gas generated by an explosion in the pulse combustor is ejected through the holes at the both ends of the pulse combustor. In this case, most of the high temperature and high pressure combustion gas is ejected through only one of the holes and utilized to dry substances. The rest of the gas is ejected U through the other hole and utilized to dry the substances and to prevent a fall of the dew point in the collecting chamber. Thus, the smaller part of the combustion gas is conveyed to the collecting changer, where substances to be dried are stacked, in order to increase heat efficiency by utilizing the gas to dry the substances and prevent a fall of the dew point. However, the heat of the combustion gas which has comparatively high temperature and is ejected from the pulse combustion drying apparatus is not utilized at all.

SUMMARY OF THE INVENTION

It is therefore an object of the present invention to provide a heat recovery system for a pulse combustion drying apparatus where the utilization of the combustion gas ejected from the pulse combustor increases the heat efficiency.

DETAILED DESCRIPTION OF THE PREFERRED EMBODIMENTS

In order to attain the above-described object, according to the present invention, a means is provided for recovering with the compressed air by an exchanging means at least either the heat of the combustion gas ejected from the pulse combustion drying apparatus or the heat of the liquid deposited in the slurry tank. Thereby, the compressed air, which is the main medium of the heat recovery, obtains high temperature. The heated compressed air flows in a membrane tube acting as the outer wall of the dryer or spiraling around the wall of the dryer. At that time, the heated compressed air thermally shields the inner wall of the dryer from fresh air to maintain the temperature in the dryer.

With regard to a pulse combustion drying apparatus provided with a heat recovery system where the liquid deposited in the slurry tank is circulated by circulating means so that the liquid is conveyed to heat exchanging means to get heat from the combustion gas ejected from the pulse combustion drying apparatus, flows in the membrane tube acting as the outer wall of the dryer or spiraling around the wall of the dryer and is returned to the slurry tank, the liquid is the main medium of the heat recovery. The circulated liquid obtains heat by the heat exchanging means, and the heated liquid thermally shields the inner wall of the dryer from fresh air to maintain the temperature in the dryer.

Figure 1:
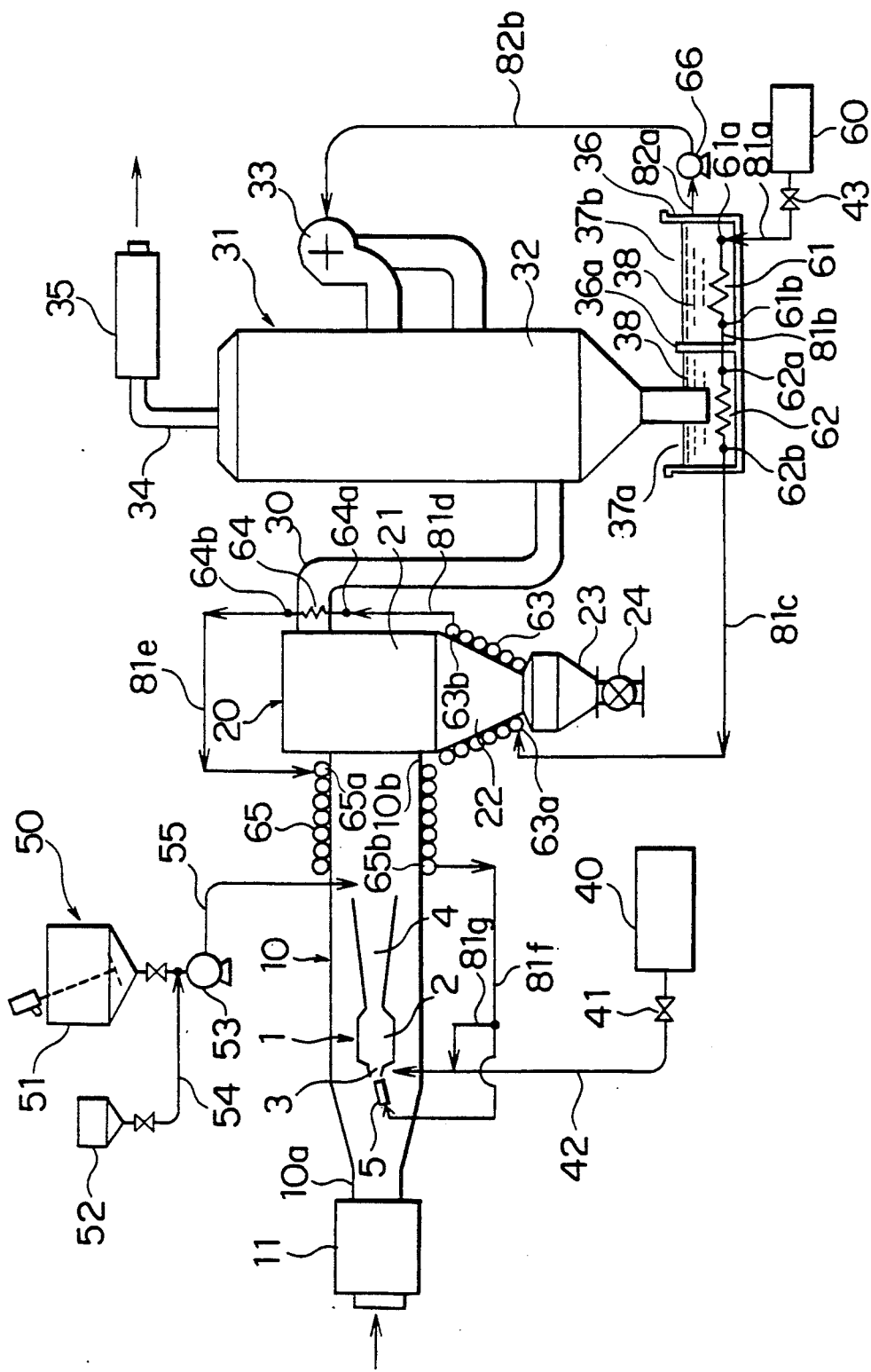
FIG. 1 is a schematic view of a pulse combustion drying apparatus provided with a first exemplary heat recovery system embodying the principles and features of the present invention.
Figure 2:
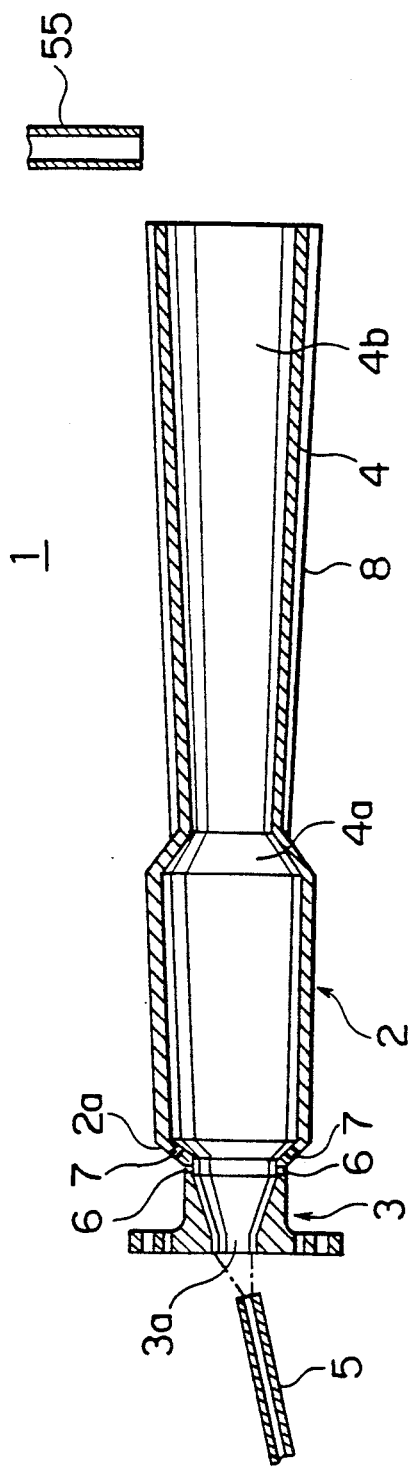
FIG. 2 is a vertical sectional view of a pulse combustor of the pulse combustion drying apparatus shown in FIG. 1.
Figure 3:
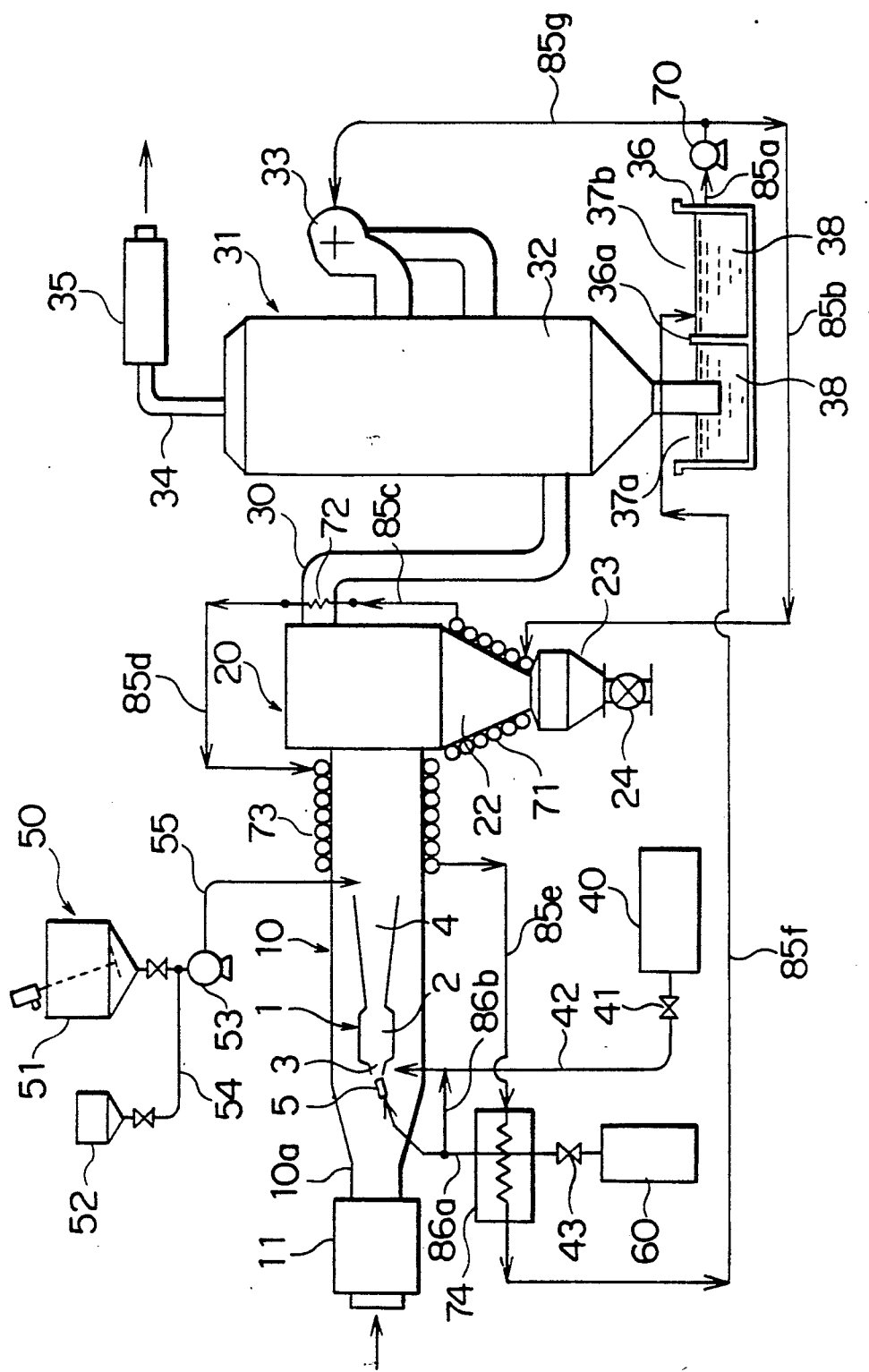
FIG. 3 is a schematic view of a pulse combustion drying apparatus provided with a second exemplary heat recovery system embodying the principles and features of the present invention.

The following description with reference to the accompanying drawings is of exemplary pulse combustion drying apparatuses embodying the principles and features of the present invention, in which FIG. 1 is a schematic view of a pulse combustion drying apparatus provided with a first exemplary heat recovery system; FIG. 2 is a vertical sectional view of a pulse combustor of the pulse combustion drying apparatus shown in FIG. 1; and FIG. 3 is a schematic view of a pulse combustion drying apparatus provided with a second exemplary heat recovery system.

FIG. 1 shows a schematic composition of a pulse combustion drying apparatus provided with a first exemplary heat recovery system. According to this heat recovery system, compressed gas is used as the main medium of heat exchange, and especially in this embodiment, compressed air is used. The pulse combustion drying apparatus comprises a pulse combustor 1, a dryer 10 disposed on the same axis as the pulse combustor 1 and enclosing the pulse combustor 1, a product collector 20 attached to the dryer 10 at the ejection site, a scrubber 31 connected to the product collector 20 through a duct 30, a fuel supply device 40 for the pulse combustor 1, and a substance supply device 50.

The pulse combustor 1 is so made that a cross section thereof is a circle. A combustion chamber 2 is constructed in the middle of the pulse combustor 1. An air intake 3 is formed at one side of the combustion chamber 2, and an exhaust pipe 4 is formed at the other side. The combustion chamber 2, the air intake 3 and the exhaust pipe 4 have a common axis. FIG. 2 is a vertical sectional view of the pulse combustor 1. The air intake 3 is shaped like a taper and becomes wider gradually near the combustion chamber 2. The exhaust pipe 4 is of Venturitube type, and it has an inflow port 4a tapering at a keen angle next to the combustion chamber 2 and an exhaust port 4b becoming wider gradually. A widening wall 2a, which becomes wider at a keen angle and is a part of the combustion chamber 2, is formed at the border of the air intake 3 and the combustion chamber 2. A plurality of fuel holes 7 incorporating fuel nozzles (not shown) for supplying a mixture of fuel and air for the combustion chamber 2 are made in the wall 2a. The fuel is supplied by the fuel supply device 40 through a fuel pipe 42 via a valve 41 and taken into the combustion chamber 2 through the fuel holes 7.

At the downstream side of the air intake 3, that is, in the wall of the air intake 3 near the combustion chamber 2, a plurality of ignition holes incorporating ignition means such as ignition plugs (not shown) are made. A compressed air injection nozzle 5 is so disposed that the outlet opposes the open end 3a of the air intake 3. This injection nozzle 5 jets compressed air to push the combustion gas which was generated at the time of an explosion in the combustion chamber 2 and flew to the air intake 3 back to the combustion chamber 2 and further to the exhaust pipe 4. The heat from an explosion provides the outer wall of the pulse combustor 1 with high temperature, and it is necessary to lower the temperature of the outer wall of the pulse combustor 1 for a long life of the pulse combustor 1. Hence, many fins 8 are disposed around the pulse combustor 1 in order to increase heat dissipation from the outer wall of the combustion chamber 2, the air intake 3 and the exhaust pipe 4.

The dryer 10 is cylindrical, and inside the dryer 10 the pulse combustor 1 is disposed having substantially the same axis as the dryer 10. The intake side 10a of the dryer 10 is tapered at a dull angle, and the intake side 10a is connected to a muffler 11. The exhaust side 10b of the dryer 10 is connected to the product collector 20.

The product collector 20 comprises a vertical cylindrical part 21, a tapering part 22 which is tapered at a dull angle, a collecting room 23 disposed under the tapering part 22 and an outlet 24.

The cut 30 connects the collector 20 with the scrubber 31. The duct 30 is extended from an upper part of the cylindrical part 21, which is opposite the connecting place of the cylindrical part 21 and the dryer 10, to a lower part of the scrubber 31.

The scrubber 31 comprises a vertical cylindrical part 32, a fan part 33 fixed on the outer frame, a muffler 35 connected to the cylindrical part 32 through a pipe 34 and a slurry tank 36 disposed below the cylindrical part 32. The fan part 33 has a function of reducing the pressure in the scrubber 31 and further reducing the pressure in the whole drying apparatus.

The fuel supply device 40 is connected to the fuel nozzles disposed in the fuel holes 7 in the wall 2a through a fuel pipe 42 which has a valve 41 and pierces into the dryer 10. Natural gas, propane gas, oil or the like may be used as fuel.

The substance supply device 50 comprises a substance tank 51, a water tank 52 and a slurry pump 53. The substance tank 51 is connected to the slurry pump 53, and the water tank 52 is connected to the slurry pump 53 through a pipe 54. A substance supply pipe 55 extended from the slurry pump 53 pierces into the dryer 10, and the outlet is disposed at the downstream side of the exhaust pipe 4.

This apparatus may be used to dry waste liquid including aluminum, calcium, iron oxide or the like, such food as slurry, east, etc. and such medicine as vitamins.

The operation of the pulse combustion drying apparatus with the composition above is described below.

When the pulse combustion drying apparatus is started, first fresh air is taken into the dryer 10 through the muffler 11 disposed upstream of the dryer 10, and the gas and dust remained in the dryer 10 are ejected outside, as the fan part 33 of the scrubber 31 operates. This prevents poor combustion.

A proper mixture of air and fuel is supplied for the combustion chamber 2 through the fuel holes 7 made in the wall 2a of the combustion chamber 2. The ignition means such as ignition plugs disposed in the ignition holes 6 of the air intake 3 generates a spark, and the spark causes an explosion of the mixture of air and fuel filled in the combustion chamber 2. Most of the high temperature combustion gas generated by the explosion flows to the exhaust pipe 4, and the rest flows to the air intake 3. The combustion gas flowing to the air intake 3 is pushed back to the combustion chamber 2 and further to the exhaust pipe 4 by the compressed air discharged from the compressed air injection nozzle 5. Immediately after the explosion, the pressure inside the combustion chamber 2 becomes higher, and the supply of the mixture of air and fuel is stopped temporarily. Thereafter, when the pressure inside the combustion chamber 2 becomes lower, the intake of the mixture of air and fuel is resumed, and an explosion is caused again either by a spark generated by the ignition means or by the contact of the mixture of air and fuel with the sufficiently heated wall of the combustion chamber 2. This action is repeated successively. Once the temperature in the combustion chamber 2 reaches a certain degree, the use of the ignition means is unnecessary and explosions occur automatically. Thus, the pulse-like pressure fluctuation in the pulse combustor 1 generates strong sound waves, and the sound waves are mainly propagated from the combustion chamber 2 to the exhaust pipe 4. Also, gas with high temperature of about 1,400°–1,500° C. generated by the repeated explosions flows to the exhaust pipe 4 following the propagation of the impact.

Substances to be dried by the drying apparatus which are in a state of slurry or paste are put in the substance tank 51. The substances are mixed with air and water case by case so that the drying procedure will be the most efficient, and the mixture is conveyed by the slurry pump 53 to the slightly downstream side of the exhaust pipe 4 of the pulse combustor 1 through the supply pipe 55. The substance mix is exposed to the strong sound waves. Then, the substance mix is divided into a solid element crushed into pieces and a liquid element in mist because of the effect of the strong sound waves to damage viscosity and surface tension, which effect has not been reported officially. The heat of the combustion gas is fit to vaporize the liquid element whose surface area increased, and the most of the heat is spent for the vaporization of the liquid element. Meanwhile, the substance mix contacts with the combustion gas with high temperature of about 1,400°–1,500° C. only for an extremely short time of 0.005–0.01 seconds. Thus, since the contact time of the substance mix with the high temperature combustion gas is extremely short and a large amount of heat is spent for the vaporization of the liquid element, the dried solid element has relatively low temperature (about 30°–60° C.) when it is discharged from the dryer 10 to the product collector 20.

As a result of the efficient evaporation, the temperature of the combustion gas discharged to the collector 20 is close to the dew point. Hence, it is necessary to prevent the gas from the changing into liquid and depositing on the surface of the substances in the collector 20. For this reason, the heat recovery system which will be described below is applied. Most of the solid element discharged to the collector 20 is collected in the lower part of the collector 20 because of the gravity, and only a part of the solid element which is relatively light moves with the combustion gas to the scrubber 31 through the duct 30. The dried substances collected in the collector 20 are ejected from the pulse combustion drying apparatus through the outlet 24 disposed at the bottom of the collector 20.

The light solid element and the combustion gas are sorted in the scrubber 31, and the solid element is eliminated. Only the gas is transported through the pipe 34 and the muffler 35 and then ejected. The solid element is ejected to a precipitator 37a of the slurry tank 37 disposed at the bottom of the scrubber 31. The clean water in the precipitator 37a overflows to a clean water tank 37b disposed next to the precipitator 37a, and the water is supplied for the fan part 33 of the scrubber 31 again through a circulating water pump 66.

The composition of the heat system is hereinafter described.

The heat recovery system comprises an air compressor 60, a first pair of heat exchangers 61 and 62 which are provided for the slurry tank 36 of the scrubber 31, a first membrane tube 63 disposed on the wall of the tapering part 22 of the product collector 20, a second heat exchanger 64 disposed in the duct 30, a second membrane tube 65 disposed on the wall of the dryer 10 at the downstream side and the recirculating water pump 66.

The air compressor 60 supplies compressed air which is the main medium of the heat recovery. The compressed air is discharged from an air pipe 81a with a valve 43 whose end is at an end 61a of the heat exchanger 61.

The first pair of heat exchangers 61 and 62 are connected with each other by an air pipe 81b which pierces through the wall 36a of the slurry tank 36 between the other end 61b of the heat exchanger 61 and one end 62a of the other heat exchanger 62. The pair of heat exchangers 61 and 62 work to transmit the heat of the water 38 deposited in the slurry tank 36 to the compressed air flowing in the heat exchangers 61 and 62.

The first membrane tube 63 spirals up around the tapering part 22 of the product collector 20, and an end 63a of the membrane tube 63 is connected to the end 62b of the heat exchanger 62 by an air pipe 81c. The first membrane tube 63 transmits the heat of the combustion gas in the product collector 20 to the compressed air flowing in the membrane tube 63.

The second heat exchanger 64 is extended in the direction perpendicular to the direction of the flow of the combustion gas in the duct 30. An end 64a of the second heat exchanger 64 and the end 63b of the first membrane tube 63 are connected by an air pipe 81d. The second heat exchanger 64 transmits the heat of the combustion gas in the dust 30 to the compressed air in the second heat exchanger 64.

The second membrane tube 65 spirals around the downstream part of the wall of the dryer 10. An end 65a of the second membrane tube 65 is connected to the end 64b of the second heat exchanger 64 by an air pipe 81e. The compressed air flowing in the second membrane tube 65 thermally shields the downstream part of the wall of the dryer 10 from fresh air in order to maintain the temperature in the dryer 10.

Further, the second membrane tube 65 and the injection nozzle 5 are connected to each other by an air pipe 81f extended from the end 65b of the membrane tube 65 and piercing through the wall of the dryer 10. An air pipe 81g diverging from the air pipe 81f leads to the fuel pipe 42, and thereby a part of the compressed air is mixed with the fuel.

The circulating water pump 66 supplies the water 38 deposited in the slurry tank 36 of the scrubber 31 back to the fan part 33 of the scrubber 31. A water pipe 82a connects the water inlet of the pump 66 with the slurry tank 36, and a water pipe 82b connects the water outlet of the pump 66 with the fan part 33 of the scrubber 31.

The operation of the heat recovery system with the composition above is described below.

The compressed air discharged from the air compressor 60 passes through the air pipe 81a and flows to the first heat exchangers 61 and 62. While the compressed air is flowing in the heat exchangers 61 and 62, it is provided with the heat of the water 38 in the slurry tank 36. The water 38 in the slurry tank 36 is always circulated by means of the circulating water pump 66 while the pulse combustion drying apparatus is in operation. More specifically, the water 38 deposited in the clean water tank 37b of the slurry tank 36 flows in the water pipe 82a to the pump 66 and is pumped into the water pipe 82b to be conveyed to the fan part 33 of the scrubber 31. The water 38 conveyed to the fan part 33 is made into fine drops by the moving vanes of the fan, and the drops come into contact with the combustion gas with comparatively high temperature in the scrubber 31. At that time, the water drops 38 absorb the heat of the combustion gas and also collect the light solid element of the dried substances which was not collected in the product collector 20. The water drops 38 which absorbed the heat fall down to the precipitator 37a of the slurry 36. The water 38 deposited in the precipitator 37a overflows to the clear water tank 37b next to the precipitator 37a. In this embodiment, when the pulse combustion drying apparatus is operated ordinarily, the temperature of the water 38 in the slurry tank 36 is about 40°-60° C.

The compressed air, whose temperature becomes higher as flows in the first heat exchanger 61 and 62, flows through the air pipe 81c to the first membrane tube 63 where the combustion gas with high temperature of about 100°-130° C. in the product collector 20 provides heat for the membrane tube 63 spiraling around the tapering wall 22 of the collector 20. Further, the heat is transmitted to the compressed air flowing in the first membrane tube 63. Since the compressed air always takes heat from the tapering wall 22 where the first membrane tube 63 spirals, the temperature in the lower part of the product collector 20 becomes lower, and thereby the dried substances deposited in the lower part are cooled speedily.

The compressed air which was provided with heat in the first membrane tube 63 passes through the air pipe 81d to the second heat exchanger 64 to get more heat from the combustion gas with high temperature of about 100°-130° C. in the duct 30.

The thus heated compressed air flows through the air pipe 81e to the second membrane tube 65. The heated compressed air in the second membrane tube 65 thermally shields the wall of the dryer 10 from fresh air. Thereby, the downstream part of the dryer 10, that is, the part where substances including water contact is maintained about 100°-150° C., which prevents a fall of the dew point in the dryer 10 and increases the drying efficiency.

Further, the heated compressed air flows from the second tube 65 to the injection nozzle 5 through the air pipe 81f, and the compressed air is discharged from the injection nozzle 5 toward the air intake 3 of the pulse combustor 1. The compressed air discharged therefrom pushes the combustion gas which flew from the combustion chamber 2 to the air intake 3 back to the combustion chamber 2 and further to the exhaust pipe 4. At that time, since the compressed air has high temperature, it does not lower the temperature in the pulse combustor 1 very much, whereby the combustion efficiency of the pulse combustor 1 is increased.

Meanwhile, a part of the heated compressed air flows through the air pipe 81g diverging from the pipe 81f into the fuel pipe 42, and the compressed air and the fuel are mixed with each other at a proper ratio. The mixture of the air and the fuel is supplied for the combustion chamber 2 of the pulse combustor 1. Fuel mixed with heated compressed air is easy to explode, and the mixture of the compressed air and the fuel contributes to an increase of the combustion efficiency of the pulse combustor 1.

FIG. 3 is a schematic view of a pulse combustion drying apparatus provided with a second exemplary heat recovery system according to the present invention. In this heat recovery system, liquid, especially in this embodiment, water is used as the main medium of heat exchange. Because all parts of this pulse combustion drying apparatus are the same as those of the apparatus in the first embodiment other than the heat recovery system, the description of the same parts is omitted here.

First, the composition of the heat recovery system in the second embodiment is described. The heat recovery system comprises a circulating water pump 70, a first membrane tube 71 spiraling up around the tapering part 22 of the product collector 20, a first heat exchanger 72 disposed in the duct 30, a second membrane tube 73 spiraling around the downstream part of the wall of the dryer 10 and a second heat exchanger 74.

The circulating water pump 70 circulates water which is the main medium of heat recovery. A water pipe 85a extends from the water inlet of the pump 70 to the slurry 36, and two water pipes 85b and 85g are diverged from the water outlet of the pump 70 and lead to the first membrane tube 71 and the fan part 33 of the scrubber 31 respectively. The first membrane tube 71 spirals up around the tapering part 22 of the product collector 20. The first membrane tube 71 is provided so that the heat of the combustion gas in the product collector 20 is transmitted to the water flowing in the first membrane tube 71. The first heat exchanger 72 is extended in the direction perpendicular to the direction of the flow of the combustion gas in the duct 30, and a water pipe 85c connects the heat exchanger 72 with the first membrane tube 71. The first heat exchanger 72 is provided so that the heat of the combustion gas flowing in the duct 30 is transmitted to the water flowing in the first exchanger 72. The second membrane tube 73 spirals around the downstream part of the wall of the dryer 10, and it is connected with the first heat exchanger 72 by a water pipe 85d. The water flowing in the second membrane tube 73 thermally shields the wall of the dryer 10 from fresh air in order to maintain the temperature in the dryer 10. A water pipe 85e connects the second membrane tube 73 with the second heat exchanger 74 disposed at a predetermined place. The second heat exchanger 74 is provided so that the heat of the water flowing in the second heat exchanger 74 is transmitted to the compressed air discharged from the air compressor 60. A water pipe 85f connects the second heat exchanger 74 with the clean water tank 37 of the slurry tank 36 of the scrubber 31.

The operation of the heat recovery system with the composition above is hereinafter described.

The circulating water pump 70 takes water 38 deposited in the slurry tank 36 of the scrubber 31 through the water inlet. At that time, the temperature of the water 38 is always about 40°-60° C. while the pulse combustion drying apparatus is in operation because the water 38 is provided with heat by the combustion gas with high temperature in the scrubber 31 in the same way as described in the first embodiment. The water is pumped into the water pipe 85b and flows to the first membrane tube 71 to get heat from the combustion gas with high temperature of 100°-130° C. in the product collector 20. The water flows to the first heat exchanger 72 to get more heat from the combustion gas with high temperature of 100°-130° C. flowing in the duct 30. The thus heated water flows to the second membrane tube 73 and thermally shields the wall of the dryer 10 from fresh air. Thereby, the downstream part of the dryer 10, that is, the place where substances including water contact is maintained about 100-°150° C., which prevents a fall of the dew point in the dryer 10 and increases the drying efficiency. Further, the heated water flows to the second exchanger, 74 and provides heat for the compressed air flowing in the pipe 86a.

This compressed air is supplied by the air compressor 60, and the thus heated compressed air is discharged from the injection nozzle 5 toward the air intake 3 of the pulse combustor 1. The discharged compressed air pushes the combustion gas which flew from the combustion chamber 2 back there to and and further to the exhaust pipe 4. At that time, since the compressed air has high temperature, the temperature in the pulse combustor 1 is not lowered very much, which increases the combustion efficiency of the pulse combustor 1. Meanwhile, a part of the heated compressed air flows through the air pipe 86b diverging from the air pipe 86a to the fuel pipe 42, and the air and the fuel is mixed with each other at a proper ratio. The mixture of the air and the fuel is supplied for the combustion chamber 2 of the pulse combustor 1. Fuel mixed with heated compressed air is easy to explode, and the mixture of the compressed air and the fuel contributes an increase of the combustion efficiency.

The heat recovery system according to the present invention is not limited to the embodiments above, and various changes and modifications are available within the scope of the present invention defined by the claims.

Especially with regard to the heat exchanging means, the heat exchangers and the membrane tubes may be combined arbitrarily.

A pulse combustor to be applied to the heat recovery system is not limited to the type used in the above-described embodiments, and various types of linear pulse combustor and U-shaped pulse combustor may be applied.

As described above, according to the present invention, the heat of the combustion gas which has been conventionally ejected from the drying apparatus and the heat of the liquid which has been conventionally ejected from the scrubber are recycled by heat exchanging means so that the heat is used to thermally shield the wall of the dryer from fresh air to maintain the temperature in the dryer by disposing a membrane tube around the wall of the dryer or utilizing a membrane tube as the outer wall of the dryer. Thereby, the dew point in the dryer is prevented from becoming lower, and the drying efficiency is increased, which cuts the fuel cost. Hence, such a heat recovery system to be applied to a pulse combustion drying apparatus increases the heat efficiency.

I claim:

1. A heat recovery system for a pulse combustion drying system in which an exhaust gas of combustion from a pulse combustor passes successively through a dryer, a product collector and a scrubber, wherein heat of the exhaust gas is recovered in the scrubber by spraying water into the exhaust gas and transferring by heat exchange the heat recovered by the water from the exhaust gas to a compressed air stream by passing the compressed air stream successively through a membrane heat exchange tube on the wall of the product collector and a membrane heat tube on the wall of the dryer and discharging the heated compressed air stream into an air-injection nozzle of the pulse combustor.

2. A heat recovery system for a pulse combustion drying system in which exhaust gas of combustion from a pulse combustor passes successively through a dryer, a product collector and a scrubber wherein heat of the exhaust gas is recovered in the scrubber by spraying water into the exhaust gas to form heated water, and passing the heated water successively through a membrane heat exchange tube on the wall of the product collector, a membrane heat exchange tube on the wall of the dryer and a heat exchanger in a duct connecting the product collector and the scrubber to transfer the recovered heat in the water to compressed air which is discharged into an air-injection nozzle of the pulse combustor.

* * * * *